United States Patent

Clarke et al.

[15] 3,669,893

[45] June 13, 1972

[54] INHIBITING AGENTS, WASHING COMPOSITIONS AND SOLUTIONS CONTAINING THE SAME, AND PROCESSES FOR USING THE SAME

[72] Inventors: Fredric B. Clarke, Watertown, Mass.; John W. Lyons, St. Louis, Mo.

[73] Assignee: Monsanto Company, St. Louis, Mo.

[22] Filed: Feb. 5, 1971

[21] Appl. No.: 113,032

Related U.S. Application Data

[63] Continuation of Ser. No. 746,320, July 22, 1968, abandoned.

[52] U.S. Cl. ................................252/156, 134/2, 134/22, 134/29, 134/42, 252/99
[51] Int. Cl. ..........................................C11d 7/06
[58] Field of Search ................252/156, 99; 136/2, 22, 29, 136/49

[56] References Cited

UNITED STATES PATENTS

| 3,278,446 | 10/1966 | Irani | 252/156 X |
| 3,297,578 | 1/1967 | Crutchfield et al. | 252/99 |
| 3,453,144 | 7/1961 | Morgan et al. | 134/42 X |

OTHER PUBLICATIONS

Pfizer–Technical Bulletin No. 99. Pfizer Gluconates in Caustic Bottle Washing July 1959, Pages 2, 3, 6 and 7

*Primary Examiner*—Mayer Weinblatt
*Attorney*—Richard W. Sternberg, Roger R. Jones and James J. Mullen

[57] ABSTRACT

This invention relates to novel methods for washing rigid materials such as glass bottles with a novel washing solution containing a novel inhibiting agent, which effects a synergistic inhibiting action, consisting of a combination of (1) a gluconate material such as sodium gluconate, (2) an aminophosphonate such as amino tri(methylene phosphonic acid) and (3) an alkylidene diphosphonic acid such as 1-hydroxy, 1-ethylidene diphosphonic acid.

2 Claims, No Drawings

INHIBITING AGENTS, WASHING COMPOSITIONS AND SOLUTIONS CONTAINING THE SAME, AND PROCESSES FOR USING THE SAME

This application is a continuation of Ser. No. 746,320, filed July 22, 1968 now abandoned.

This invention relates to methods and compositions for washing the surfaces of rigid articles. More particularly, this invention relates to the use of novel inhibiting agents contained in novel compositions for washing articles such as glassware, metal, rubber and the like.

Such industries as the dairy and soft drink industries extensively use strongly alkaline solutions for washing bottles and glassware. Ordinary or tap water is customarily used with an alkaline cleanser to form the cleansing solution as well as for rinsing purposes. As is well known in using such a washing process, a major problem is the precipitation under highly alkaline conditions of, for example, iron, calcium and magnesium salts dissolved in the tap water. This problem manifests itself in such ways as depositing unsightly films on the articles being washed and interfering with the washing equipment, thus requiring frequent maintenance. The prior art solution to this problem has usually been approached by the use of an inhibiting agent (hereinafter functionally defined) which prevents or minimizes the precipitation to some degree of such iron, calcium and/or magnesium salts. However, inhibiting agents customarily employed, such as polyphosphates, amino carboxylic acid derivatives and gluconates, have limitations which sometimes seriously restrict their use. For example, the polyphosphates, e.g. sodium tripolyphosphate and tetra sodium pyrophosphate, are susceptible to hydrolysis or degradation, the rate of which is primarily dependent on pH and temperature conditions. This degradation consequently reduces their effectiveness in the end use application. Certain amino carboxylic acid derivatives do not function effectively when used with an alkali cleanser. Gluconates do not effectively inhibit the precipitation of the calcium and magnesium compounds in the presence of such compounds as the soluble silicates and phosphates.

It is to be understood that the term "inhibiting agent" as used herein refers to any material which to some degree prevents the precipitation of salts of cations such as alkaline earth cations – calcium, magnesium and the like from the solution which contains the agent and cations. Thus this term includes (1) such materials which act as sequestering or chelating agents wherein at least stoichiometric amounts of such agents are required; and (2) such materials which are utilized in "threshold" amounts, i.e. less-than-stoichiometric amounts. (The "threshold effect" is generally known in the art wherein the precipitation inhibitor (agent) is present in a potentially scale forming system at a markedly lower concentration than that required for sequestering the scale forming cation.)

Inhibiting the precipitation of various metallic ions in solution is a complex phenomenon believed to involve very many factors such as, for example, pH, temperature, stability and the like. In other words, no general basis has been found or is known either as regards physical properties or in chemical structure upon which one can predict with any degree of accuracy the excellence, ranking or performance of chemical materials or mixtures thereof as inhibiting agents. As can be appreciated, therefore, an inhibiting agent which is substantially "hydrolytically stable," which prevents the precipitation of a metallic ion such as, for example, iron, calcium and magnesium, and which functions effectively with alkali cleansers in the presence of compounds such as soluble silicates, phosphates and carbonates would represent an important advancement in and substantial contribution to the art.

Accordingly, it is a basic object of the present invention to attain an enhanced inhibiting action associated with washing compositions containing an inhibiting agent.

It is also an object of the present invention to attain an enhanced inhibiting action especially in strongly alkaline washing solutions.

It is another object of the present invention to provide a synergistic inhibiting combination having inhibiting properties substantially greater than those obtained by any one component of the combination when used alone.

Another object of the present invention is to provide an improved alkali cleanser composition which is especially well suited for washing articles such as glassware, metal, rubber and the like.

Other objects and advantages of the present invention will become apparent from a reading of the subsequent detailed description and the appended claims.

According to the present invention, the foregoing and other objects are attained, and an unexpected and synergistic inhibiting action is displayed by the present invention inhibiting agent which is a tri-component combination consisting of (1) a gluconate material, hereinafter defined; (2) an amino phosphonate, hereinafter defined; and (3) an alkylidene diphosphonic acid, hereinafter defined. It is to be understood that the term "inhibiting agent" as used herein and when referring to the present invention connotates the novel tri-component combination described above. One of the most unique facets of the present invention relates to the fact that it was quite surprising and totally unexpected to discover that the novel inhibiting agent (which comprises the three components heretofore mentioned) effects a synergistic action which is completely superior to any one of the components when used alone. Furthermore, this novel inhibiting agent can be used at substantially lower levels than either one of the individual components in the washing solution and still substantially perform in a manner significantly better than when either one of the individual components is used alone as an inhibiting agent.

Referring now more specifically to the three components which make up the novel inhibiting agent of the present invention, the gluconate material heretofore set forth is from the group gluconic acid, an alkali metal salt thereof such as sodium gluconate, heptagluconic acid and alkali metal heptagluconates. It is to be understood that these gluconate materials are illustrative of the gluconate material which is utilized in the present invention inhibiting agent, and that any precursor, which would provide the $HOCH_2(CHOH)_4COO^-$ radical and/or the $HOCH_2(CHOH)_5COO^-$ radical, when dissolved in solution is to be considered as encompassed within the term "-gluconate material." The gluconate material is utilized in an amount of from about 5 percent to about 60 percent, preferably from about 20 percent to about 45 percent by weight, based on the total weight of the inhibiting agent per se.

The amino phosphonate material which is the second component in the novel inhibiting agent of the present invention is a nitrogen containing compound having the following formula

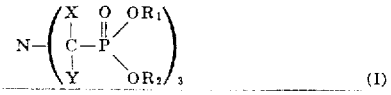

(I)

wherein X and Y are each from the group hydrogen and lower alkyl, such alkyl containing from one to four carbon atoms. $R_1$ and $R_2$ are each from the group alkali metal (such as sodium, potassium, lithium), ammonium, amino, hydrogen or lower alkyl, such alkyl group containing one to four carbon atoms.

Compounds which are illustrative of the above-described amino phosphate material falling within the above Formula I, are as follows:

1. amino tri(methylene phosphonic acid), herein referred to as ATMP $N(CH_2P(O)(OH)_2)_3$
2. amino tri(ethylidenephosphonic acid) $N((CH_3)CHP(O)(OH)_{eu'})_3$
3. amino tri(isopropylidenephosphonic acid) $N((CH_3)(CH_3cp,o.,oh._2)_3$ The amino tri(lower alkylidenephosphonic acids) and their salts may be prepared by the processes disclosed in U.S. Pat. No. 3,288,846 which is incorporated herein by reference.

It is to be understood that while the sodium salts of amino tri(lower alkylidenephosphonic acids) are preferred, and in particular the penta sodium salt, other alkali metal salts, such as potassium, lithium and the like as well as mixtures of the alkali metal salts, may be substituted therefor. In addition any water soluble salt, such as the ammonium salt (e.g., $$N(CH_2PO_3(NH_4)_2)_2(CH_2PO_3HNH_4))$$

and the amine salts, (e.g., $[CH_2PO_3(N(CH_3)_2bq2]_2[CH_2PO_3HN(CH_3)_2]$ ) which exhibit the characteristics of the alkali metal salt may be used to practice the invention. Since the alkali cleanser compositions are used in strongly alkaline aqueous systems as will be more fully discussed hereinafter, the amino tri(lower alkylidene phosphonic acids) may be used by adjusting, if required, the cleanser composition or the resulting aqueous washing solution to the desired alkaline condition.

The above-described amino phosphonate material is used in an amount of from about 25 to about 75 percent, preferably from about 30 to about 60 percent by weight, based on the total weight of the inhibiting agent per se.

The third component of the novel inhibiting agent of the present invention is an alkylidene diphosphonic acid having the following formula $$(OH)_2=P-\left(\begin{array}{c}X \\ | \\ C \\ | \\ Y\end{array}\right)_n-P=(OH)_2 \quad (II)$$

wherein $n$ is an integer from 1 to 10, X is from the group hydrogen or lower alkyl, said alkyl group containing one to four carbon atoms, and Y is from the group hydrogen, hydroxyl, lower alkyl, said lower alkyl containing one to four carbon atoms, or amino.

Compounds falling within the above formula II and which are illustrative thereof include:

1. methylenediphosphonic acid, $$(OH)_2(O)PCH_2P(O)(OH)_2$$

2. ethylidenediphosphonic acid, $$(OH)_2(O)PCH(CH_3)P(O)(OH)_2$$

3. isopropylidenediphosphonic acid, $$(OH)_2(O)PCH(CH_3CH_3)P(O)(OH)_2$$

4. 1-hydroxy, ethylidenediphosphonic acid, herein referred to as HEDP, $$(OH)_2(O)PC(OH)(CH_3)P(O)(OH)_2$$

5. hexamethylenediphosphonic acid, $$(OH)_2(O)PCH_2(CH_2)_4CH_2P(O)(OH)_2$$

6. trimethylenediphosphonic acid, $$(OH)_2(O)P(CH_2)_3P(O)(OH)_2$$

7. decamethylenediphosphonic acid $$(OH)_2(O)P(CH_2)_{10}P(O)(OH)_2$$

8. 1-hydroxy, propylidenediphosphonic acid, $$(OH)_2(O)PC(OH)(CH_2CH_3)P(O)(OH)_2$$

9. 1,6-dihydroxy,1,6-dimethyl, hexamethylenediphosphonic acid, $$(OH)_2(O)PC(CH_3)(OH)(CH_2)_4C(CH_3)(OH)P(O)(OH)_2$$

10. 1,4-dihydroxy,1,4-diethyl, tetramethylenediphosphonic acid, $$(OH)_2(O)PC(C_2H_5)(OH)(CH_2)_2C(C_2H_5)(OH)P(O)(OH)_2$$

11. 1,3-dihydroxy,1,3-dipropyl, trimethylenediphosphonic acid, $$(OH)_2(O)PC(C_3H_7)(OH)(CH_2)C(C_3H_7)(OH)P(O)(OH)_2$$

12. 1,4-dibutyl, tetramethylenediphosphonic acid, $$(OH)_2(O)PCH(C_4H_9)(CH_2)_2CH(C_4H_9)P(O)(OH)_2$$

13. dihydroxy, diethyl, ethylenediphosphonic acid, $$(OH)_2(O)PC(OH)(C_2H_5)C(OH)(C_2H_5)P(O)(OH)_2$$

14. tetrabutyl, butylenediphosphonic acid, $$(OH)_2(O)P[CH(C_4H_9)]_4P(O)(OH)_2$$

15. 4-hydroxy, 6-ethyl, hexamethylenediphosphonic acid, $$(OH)_2(O)PCH_2CH_2CH_2CH(OH)CH_2CH(C_2H_5)P(O)(OH)_2$$

16. 1-amino ethylidene diphosphonic acid $$(OH)_2(O)PC(NH_2)(CH_3)P(O)(OH)_2$$

The above-described alkylidene diphosphonic acid material is used in an amount of from about 25 to about 75 percent, preferably from about 30 to about 60 percent by weight, based on the total weight of the inhibiting agent per se.

In conjunction with the amounts of each component used in the present invention inhibiting agent, it has been found that the synergistic inhibiting action of said agent is not substantially manifested when the aforementioned amounts are reduced or increased beyond the ranges heretofore set forth. As will be shown in the examples hereinafter set forth, it is necessary that each individual component be utilized within the specific ranges such as (1) 5 to 60 percent by weight for the gluconate material; (2) 25 to 75 percent by weight for the amino phosphonate; and (3) 25 to 75 percent, by weight, for the alkylidene diphosphonic acid. This facet of the present invention was also completely unexpected as was the synergism per se exhibited by the three-component mixture, i.e. the inhibiting agent.

By the term "hydrolytically stable" as used herein, is meant a substantial resistance by the inhibiting agent to hydrolysis or degradation under various pH and temperature conditions. For example, a 20 gram sample of a mixture of (1) 10 grams of penta sodium amino tri(methylphosphonate), $N(CH_2 - PO_3Na_2)_2(CH_2 - PO_3HNa)$, and (2) 10 grams of 1-hydroxy, 1-ethylidene diphosphonic acid (HEDP), and was mixed in 100 ml. of water. A 25 ml. portion of the solution was added to a 25 ml. portion of 12 M HCl to give a 10 percent solution of such mixture in HCl. Another 25 ml. portion of the solution was added to a 25 ml. portion of 10 percent NaOH to give a 10 percent solution of such mixture in a 5 percent solution of NaOH. The foregoing 10 percent solutions were boiled for a period of 4 hours, at the end of which both solutions exhibited no change in physical properties. Nuclear magnetic resonance spectra showed the two 10 percent solutions to be identical with fresh unheated 10 percent solutions of said mixture in water at the same acid and alkaline conditions, thereby establishing the resistance of such mixture to hydrolysis or degradation under severe temperature and pH conditions. It should be noted that all known polyphosphates, whether in the acid, salt or ester form, would hydrolyze or degrade completely under the foregoing conditions. In view of the foregoing, it is believed that the inhibiting agent of the instant invention is substantially "hydrolytically stable" and would function effectively in strongly alkaline washing solutions. Consequently, these novel inhibiting agents are extremely well suited for use in many and varied applications.

In forming the washing solution, ordinary or tap water is suitable for use and customarily ranges between soft water having a hardness of about 50 ppm (expressed as $CaCO_3$) and hard water having a hardness of about 350 ppm (expressed as $CaCO_3$).

While this water hardness has been expressed as ppm $CaCO_3$, it is to be understood that other components are generally found in most public water and as such, these components also contribute to the water hardness. As illustrative of a typical water supply, the following is the composition of a sample prepared to simulate the municipal water in Dayton, Ohio:

| Component | ppm | Component | ppm |
|---|---|---|---|
| $SiO_2$ | 10 | $HCO_3^-$ | 339 |
| Ca | 90 | $SO_4$ | 83 |
| Mg | 35 | Cl | 10 |
| Na and K | 40 | $NO_3^-$ | 13 |
| | pH = 7.05 | | |

It is to be understood that the above analysis is merely illustrative of various cations and anions present in water. It is within the scope of the present invention to utilize water also containing cations such as barium and anions such as carbonate, oxalate, phosphate, fluoride, and monofluorophosphate—$PO_4F\equiv$.

The amount of inhibiting agent necessary to be used with the alkali cleanser may vary depending upon, inter alia, the end use, type of alkali cleanser employed, type and amounts of water employed and the like. However, when used in a washing solution of soft water a cleanser composition having an inhibiting agent/alkali cleanser ratio by weight of between about 1/2 to 1/400 has been particularly effective. In hard water the amount of inhibiting agent is usually increased with an inhibiting agent/alkali cleanser ratio by weight of between about 5/1 to 1/40 being particularly effective. Therefore, when used in ordinary or tap water the proportions of the inhibiting agent to alkali cleansers necessary for best results may vary between about 5/1 to 1/400 and should preferably be adjusted within the foregoing ratio to find the optimum amount necessary.

Because the present invention is primarily directed to compositions for washing articles, such as bottles and glassware, the washing solution should preferably exhibit effective germicidal action as well as cleansing action without adversely affecting the articles. The effects of soaking time, alkaline concentration, and temperature are interrelated in the sence that increased temperatures and/or concentrations diminish the washing period required to attain a given standard of cleansing and germicidal performance. In general, the temperature ranges are usually taken to be about 120°-165° F and the concentration of the alkali cleansers in the alkaline washing solution are usually taken to be about 1-5 percent by weight; although as low as 0.25 percent and as high as 20 percent alkali detergent may be employed under certain conditions. It should be noted, however, when using the free acid of the inhibiting agent and an alkali cleanser, such as sodium hydroxide, a certain amount of the sodium hydroxide which can readily be ascertained as necessary to neutralize the the acids and is not, therefore, available for its intended function. The foregoing concentrations of alkali cleansers are intended to be those which are necessary for the germicidal and cleansing action and does not include the amounts necessary for neutralization of the acid.

The invention is not to be limited to any particular method of mixing the inhibiting agent. The inhibiting agent may be mechanically mixed in, crushed in the cleanser in the form of a slurry, or dissolved in a solution of the alkali cleanser. In addition, the inhibiting agent may be admixed with the alkali cleanser in any of the forms in which the alkali cleanser is manufactured in, as well as being added simultaneously or separately to an aqueous solution. In any event, the inhibiting agent is intended to be used with the alkali cleanser at the time of application as a cleansing agent.

EXAMPLE I

In order to illustrate the unique synergism of the inhibiting agents of the present invention the following procedure is carried out. Various washing solutions, designated letters A through Z in the following Table I, are prepared by weighing out or volumetrically measuring the components and then combining them with water (of the type described to simulate the municipal water of Dayton, Ohio) in order to give the specific solutions A-Z. As shown in Table I, each component is expressed as parts per 100 parts of total wash solution. In order to test the effectiveness of these washing solutions A through Z, 1 × 3 inches pre-cleaned microscope glass slides are utilized and are dipped in the various solutions A-Z in a manner hereinafter set forth. The objective is to measure the efficiency of the various inhibiting agents and combinations thereof in minimizing or preventing build up of scale on the glass surfaces as indicated by increasing opacity to light. The overall apparatus for testing consists of a water tray, 18 × 8 × inches, containing water and an impeller of a mechanical stirrer, and an electric heating mantel having 2 elevated sides which hold a horizontally positioned rod 8 inches above 500 ml. beakers which contain the specific solutions (A-Z) and rinse solutions. This rod is used as a support member for the triple glass slides which are dipped into a wash solution as hereinafter described. These 500 milliliter beakers are partially immersed in the water in said tray and thus the solutions are maintained at a constant temperature due to the heated water which is circulated around such beakers. The electric heater is controlled by a rheostat in order to raise or lower the water temperature. The beakers containing the test and rinse solutions are partially submerged in said water which is held at a temperature of 60° ± 1° C. Three clean glass slides are concurrently but separately dipped into a wash solution, and, consequently the results recorded in Table I represent a composite of three measurements. Twenty-six, triple slides are used for the twenty-six test (wash) solutions A-Z. In the dipping procedure one cycle consists of a 30 second dip of the three glass slides in the individual wash solution, a 30 second drainage period, another 30 second dip in the wash solution, a second 30 second drainage period, followed by a 30 second rinse in clean water and drying in a current of warm air. The 26, triple slides each go through two cycles heretofore mentioned. The glass slides are not soiled prior to use.

After the triple glass slides are dried in the manner heretofore mentioned, the clarity of the dried slides are determined with a photometer. This clarity indicates the degree of effectiveness in washing the clean glass slides in the various test solutions which contain "hard water." A light beam whose intensity is stabilized by a constant voltage power supply is passed through the composite, triple glass slides, normal to their faces, and the resulting current output from the photocell is read with a micro ampmeter. A pre-cleaned, untreated bank of three slides is used as a reference. The percent decrease in transmission (of light) after treating, designated "A," is then calculated by the formula $$A = \frac{I_0 - I_s}{I_0} \times 100$$

where $I_0$ is the cell current response to the reference slide and $I_s$ is the response to the test slides. The optimum value for A is thus 0.0 percent. The precision in carrying out these measurements is ± 0.5 percent. In carrying out this procedure the light beam is concentrated around the middle of the slide faces in order that the surface evaluated would be representative of the well-drained portion of the slide.

The results as represented in percent decrease in transmission, "A," are set forth in Table I.

Referring now specifically to Table I, washing solutions A through D represent the prior art wherein a gluconate per se such as sodium gluconate is utilized to wash rigid articles such as glass bottles. The percent decrease in transmission in using washing solutions A through D is respectively 24, 30, 32 and 26.

In washing solutions E through I, various amino phosphonates per se are utilized at different levels with an alkali cleanser. The percent decrease in transmission ranges from 19 to 21; these type washing solutions are representative of the prior art washing solutions such as those described in U.S. Pat. No. 3,278,446.

In washing solutions J through P, various alkylidene diphosphonic acids per se are utilized at different levels with an alkali cleanser, sodium hydroxide. The results of washing the aforesaid glass slides in these solutions yield a percent decrease in transmission range of from 18 to 22.

The washing solutions, designated Q through V, shown in Table I are representative of the present invention and specifically demonstrate the synergistic effect obtained by using the novel inhibiting agent which consists of a specific combination of a gluconate material, an amino phosphonate and an alkylidene diphosphonate.

This synergistic effect is vividly illustrated by the substantial reduction in "A," the precent decrease in transmission when using each of solutions Q through V. Thus the range of "A" is found to be from 1.4 to 2.7 when using the novel inhibiting agents of the present invention and which "A" range represents a seven to twenty-three-fold decrease in "A" as contrasted to those values of "A" when one uses any one of the prior art inhibiting agents alone, i.e. such as those contained in washing solutions A through P.

As previously mentioned, it has been found that the synergistic inhibiting action of the inhibiting agent of the present invention is manifested when the three components are present therein at certain levels. Outside of these levels, the synergism is not substantially activated. This latter facet is more specifically demonstrated by the values of "A" shown in Table I when one uses washing solutions W, X, Y and Z. For example, in washing solution W, the inhibiting agent per se consists of 2 percent by weight of gluconic acid, 88 percent by weight amino tri(methylene phosphonic acid) and 10 percent by weight 1-hydroxy, 1-ethylidene diphosphonic acid. (Note, the numbers set forth in Table I for each of the aforementioned components are presented in parts of component per 100 parts of solution.) As can readily be seen, the use of solution W results in a value of "A" being 13. Similar values of "A" are obtained in using solutions X, Y and Z. Thus, it is apparent that outside the levels specified for each of the individual component of the present invention inhibiting agent, there is substantially no synergistic action.

Example I is again repeated with the exception that the temperature of the water (i.e. resulting washing solutions) is held at 50° C in a first repeat, 70° C in a second repeat and 80° C in a third repeat in order to evaluate the effect of temperature. The results of these experiments are substantially the same as those shown in Table I.

In view of the aforementioned, it can readily be seen that the tri-component combination which constitutes the inhibiting agent of the present invention exhibits a unique synergistic effect when utilized in a washing solution to clean various materials such as glass bottles and the like. It is to be understood that while Example I is directed to the utilization of a washing solution to clean glass objects, a variety of other objects may be cleaned in such an effective and improved manner.

What is claimed is:

1. The method of washing articles comprising applying thereto an aqueous, alkaline washing solution consisting essentially of an alkali cleanser selected from the group consisting of alkali metal hydroxides, alkali metal carbonates and mixtures thereof and an inhibiting agent which consists of (1) from about 20 to about 45 percent by weight, based on the total weight of said agent, of a gluconate material selected from the group consisting of alkali metal gluconate, gluconic acid, heptagluconic acid and alkali metal heptagluconates, (2) from about 30 to about 60 percent by weight, based on the total weight of said agent, of amino tri(methylene phosphonic acid) and (3) from about 30 to about 60 percent by weight based on the total weight of the composition of 1-hydroxy, ethylidene diphosphonic acid; the proportion by weight of said inhibiting agent to alkali cleanser being from about 1:2 to about 1:40.

2. A washing composition useful in making a strongly al-

TABLE I

| Washing solutions [1] | A | B | C | D | E | F | G | H | I | J | K | L | M |
|---|---|---|---|---|---|---|---|---|---|---|---|---|---|
| Water | 95 | 95 | 89 | 95 | 95 | 95 | 95 | 95 | 89 | 95 | 95 | 95 | 95 |
| pH | 13 | 13 | 12.8 | 13.1 | 13 | 13 | 13 | 13 | 13 | 13 | 13 | 13 | 13 |
| Temp., °C | 60 | 60 | 60 | 60 | 60 | 60 | 60 | 60 | 60 | 60 | 60 | 60 | 60 |
| Alkali cleanser: | | | | | | | | | | | | | |
| NaOH | 4.5 | 4.5 | 4.0 | 4.9 | | 4.5 | 4.5 | 4.9 | 4.0 | 4.5 | 4.5 | 4.5 | 4.5 |
| KOH | | | | | 4.5 | | | | | | | | |
| Gluconate material: | | | | | | | | | | | | | |
| Gluconic acid | | | | | | | | | | | | | |
| Sodium gluconate | 0.5 | | 5.0 | 0.1 | | | | | | | | | |
| Heptagluconate | | 0.5 | | | | | | | | | | | |
| Amino-phosphonate: [2] | | | | | | | | | | | | | |
| 1 | | | | | | 0.5 | | | 0.1 | 5.0 | | | |
| 2 | | | | | | | 0.5 | | | | | | |
| 3 | | | | | | | | 0.5 | | | | | |
| Diphosphonate: [3] | | | | | | | | | | | | | |
| 1 | | | | | | | | | | | 0.5 | | |
| 2 | | | | | | | | | | | | 0.5 | |
| 3 | | | | | | | | | | | | | 0.5 |
| 4 | | | | | | | | | | | | | |
| 5 | | | | | | | | | | | | | |
| Results: A, percent decrease in transmission | 24 | 30 | 23 | 26 | 21 | 19 | 21 | 20 | 21 | 20 | 21 | 19 | 25.7 |

| Washing solutions [1] | N | O | P | Q | R | S | T | U | V | W | X | Y | Z |
|---|---|---|---|---|---|---|---|---|---|---|---|---|---|
| Water | 95 | 95 | 89 | 95 | 95 | 90 | 95 | 95 | 95 | 95 | 95 | 95 | 93.5 |
| pH | 13 | 13 | 13 | 13 | 13 | 14 | 13 | 13 | 13 | 13 | 13 | 13 | 10 |
| Temp., °C | 60 | 60 | 60 | 60 | 60 | 70 | 60 | 60 | 60 | 60 | 60 | 60 | 60 |
| Alkali cleanser: | | | | | | | | | | | | | |
| NaOH | 4.5 | 4.8 | 4.0 | 4.75 | 4.5 | 9.68 | 4.75 | 4.75 | 4.5 | 4.5 | 4.5 | 4.5 | 4.5 |
| KOH | | | | | | | | | | | | | |
| Gluconate material: | | | | | | | | | | | | | |
| Gluconic acid | | | | | | | | | 0.05 | | 0.01 | 0.01 | |
| Sodium gluconate | | | | 0.05 | 0.1 | 0.02 | | 0.1 | | | | 0.01 | 0.01 |
| Heptagluconate | | | | | | | 0.05 | | | | | | |
| Amino-phosphonate: [2] | | | | | | | | | | | | | |
| 1 | | | | 0.1 | 0.2 | 0.17 | | | 0.2 | 0.44 | 0.05 | | |
| 2 | | | | | | | 0.1 | | | | | 0.44 | 0.05 |
| 3 | | | | | | | | 0.1 | | | | | |
| Diphosphonate: [3] | | | | | | | | | | | | | |
| 1 | | | | | | | | | 0.2 | | | | |
| 2 | | | | | | | | 0.1 | | | | 0.05 | 0.44 |
| 3 | | 0.2 | 5.0 | 0.1 | 0.2 | 0.13 | | | | 0.05 | 0.44 | | |
| 4 | | | | | | | 0.1 | | | | | | |
| 5 | 0.5 | | | | | | | | | | | | |
| Results: A, percent decrease in transmission | 19 | 18 | 22 | 2.0 | 2.7 | 2.1 | 1.6 | 2.2 | 1.4 | 13 | 15 | 14 | 14 |

[1] The components of each solution are expressed in parts per 100 parts; for example, solution "A" contains 95 parts water, 4.5 parts NaOH and 0.5 part sodium gluconate, which all total 100 parts.
[2] Compounds numbered 1, 2, and 3, respectively, correspond to those numbered nitrogen containing compounds on page 5.
[3] Compounds numbered 1, 2, 3, 4 and 5, respectively, correspond to those diphosphonic acids numbered on pages 6 and 7.

kaline washing solution consisting essentially of a combination of an alkali cleanser selected from the group consisting of alkali metal hydroxides, alkali metal carbonates and mixtures thereof and an inhibiting agent which consists of (1) from about 20 to about 45 percent by weight, based on the total weight of said agent, of a gluconate material selected from the group consisting of alkali metal gluconate, gluconic acid, heptagluconic acid and alkali metal heptagluconates, (2) from about 30 to about 60 percent by weight, based on the total weight of said agent of amino tri(methylene phosphonic acid) and (3) from about 30 to about 60 percent by weight based on the total weight of the composition of 1-hydroxy, ethylidene diphosphonic acid; the proportion by weight of said inhibiting agent to alkali cleanser being from 1:2 to about 1:40.

* * * * *